(12) United States Patent
Vinke et al.

(10) Patent No.: US 7,189,145 B2
(45) Date of Patent: Mar. 13, 2007

(54) METHOD OF AND APPARATUS FOR PRODUCING ROLL

(75) Inventors: Peter Vinke, Schwanewede (DE); Stefan Neuser, Siegen (DE); Roland Meier, Oberhausen (DE)

(73) Assignees: Waldrich Siegen Werkzeugmaschinen GmbH, Burbach (DE); Court Holdings Limited, Beamsville (CA)

( * ) Notice: Subject to any disclaimer, the term of this patent is extended or adjusted under 35 U.S.C. 154(b) by 0 days.

(21) Appl. No.: 11/082,214

(22) Filed: Mar. 15, 2005

(65) Prior Publication Data

US 2005/0227594 A1 Oct. 13, 2005

(30) Foreign Application Priority Data

Mar. 16, 2004 (DE) .................. 10 2004 013 031

(51) Int. Cl.
*B24B 1/00* (2006.01)

(52) U.S. Cl. .................. 451/39; 451/54; 451/57; 451/65; 451/67; 451/70

(58) Field of Classification Search .................. 451/39, 451/54, 65, 67, 70; 205/662, 663
See application file for complete search history.

(56) References Cited

U.S. PATENT DOCUMENTS

| | | | | | |
|---|---|---|---|---|---|
| 2,334,572 | A | * | 11/1943 | Melton et al. ................. 51/293 |
| 3,520,089 | A | * | 7/1970 | Owrey et al. ................ 451/303 |
| 4,596,066 | A | * | 6/1986 | Inoue ............................ 483/4 |
| 4,963,710 | A | * | 10/1990 | Lach ......................... 219/69.2 |
| 5,025,547 | A | * | 6/1991 | Sheu et al. ................. 29/527.4 |
| 5,193,317 | A | * | 3/1993 | Nordquist et al. ............ 451/53 |
| 5,329,733 | A | * | 7/1994 | Steere, Jr. ..................... 451/10 |
| 5,508,119 | A | * | 4/1996 | Sheu et al. ................. 428/687 |
| 5,537,851 | A | * | 7/1996 | Sheu et al. ................ 72/366.2 |
| 5,816,892 | A | * | 10/1998 | Lunn ............................ 451/21 |
| 6,461,223 | B1 | * | 10/2002 | Bando .......................... 451/12 |
| 6,722,959 | B2 | * | 4/2004 | Opfer .......................... 451/65 |
| 6,835,122 | B2 | * | 12/2004 | Jager ........................... 451/49 |
| 2004/0011768 | A1 | * | 1/2004 | Beaumont ................ 219/69.17 |
| 2004/0113580 | A1 | * | 6/2004 | Engelfried ................... 318/634 |
| 2005/0218089 | A1 | * | 10/2005 | Wei et al. .................... 210/805 |
| 2005/0247569 | A1 | * | 11/2005 | Lamphere et al. .......... 205/663 |

* cited by examiner

*Primary Examiner*—Lee D. Wilson
*Assistant Examiner*—Robert Scruggs
(74) *Attorney, Agent, or Firm*—Andrew Wilford

(57) ABSTRACT

A belt grinding is integrated with an electroerosion machine for contouring the working surface of a mill roll and providing a texture thereon. The belt grinder can superfinish the roll and remove peaks in the surface without significantly affecting the mean surface roughness produced by the electroerosion.

14 Claims, 4 Drawing Sheets

METHOD OF AND APPARATUS FOR PRODUCING ROLL

FIELD OF THE INVENTION

Our present invention relates to a method of and to an apparatus for producing a roll, especially a rolling mill roll of steel and, in particular, to a method and machine for treating the outer surface of such a rolling mill roll. More particularly, this invention relates to a method for producing or treating a rolling mill roll in which the surface of the roll is subjected to an electroerosion process and specifically an electric discharge erosion process in which the roll is brought to the desired contour.

BACKGROUND OF THE INVENTION

In order to bring the working surface, i.e. the outer surface of a roll and especially a rolling mill roll to the precise predetermined contour which the mill must have in its finished state to be able to properly roll metal strip or other workpieces, it is known to subject the roll to an electroerosion process. This process can be referred to as EDT (electric discharge texturing) and enables the profile or contour of the surface of the roll to be imparted to it with a high degree of precision.

In the EDT process, spark erosion of the surface of the roll results in a removal of material which leaves the surface of the roll with a predetermined uniform surface roughness with a mean roughness value $R_a$ and a certain number of peaks per unit area. In this process one or more electrodes are brought into juxtaposition with the surface of the roll over a precisely controlled gap, a dielectric liquid such as kerosine or oil can flood this gap and in this position of the electrode vis-a-vis the surface of the roll, an electrical generator applies a high frequency machining pulse which locally causes a discharge through the dielectric, the formation of a crater, the removal of a particle from the surface and a uniform distribution of such microcratering over the surface. The pulse forms, in the presence of the conductive particles in the dielectric, a dipole bridge across which the pulse current begins to flow. That heats a locally trough-shaped volume of the material at the surface of the roll above its melting point, causing that heated portion to expand. In the discharge channels which are formed, a gas bubble is created and when the erosion pulse terminates causes collapse of that discharge channel, the molten volume is drawn away from the surface of the roll. That leaves a trough-shaped cavity which is reproduced in a micropattern over the entire surface and enables the roll to be shaped with high precision and to very narrow tolerances.

In the rolling process the roll serves as a tool for deforming and texturing the rolled product. The roll is applied to the rolled product with the rolling force to cause the deformation of the rolled product. However, under the rolling force in the mill stand, the rolling conditions have tended in the past to change especially in the first few meters of the rolling operation after a new roll has been installed as a result of the fact that peaks on the surface of the roll tend to break off at the high specific forces which develop between the roll and the workpiece. The result is nonuniform wear of the roll, the presence of impurities on the product surface and abrasion against the product surface. The impurities are undesirable in further deformation and coating processes. The roll may require premature remachining and excessive waste of material from the roll.

As a consequence, it has been the practice to follow the electroerosion of the roll by a process for treating the roll surface to improve the quality thereof for rolling. Generally the roll is removed from the EDT texturing machine and treated with brushes and/or by means of a chemical treatment or etching so that the peaks are preferentially treated. The peaks of the roughness structure are thereby broken. To that end the roll is usually placed in a separate brushing machine or in a chemical path for etching. This increases the cost of fabricating and handling the roll. It is especially disadvantageous that in the brush treatment, there are no defined processing conditions so that the process is hardly reproducible. The process is not amenable to automation and as a consequence, the entire finishing operation in roll manufacture is detrimentally affected.

OBJECTS OF THE INVENTION

It is, therefore, the principal object of the invention to provide an improved method and apparatus for fabricating or treating a roll, especially a rolling mill roll which will simplify the fabrication or treatment process and provide a roll which has the predetermined contour and texture with a high degree of precision but wherein the aforementioned drawbacks are avoided.

More specifically, it is an object of the invention to provide a method of treating a rolling mill roll so that in the initial operation of the mill, particles will not be broken off therefrom which can act as contaminants for the surface of the roll product, which may require premature remachining of the roll or which may produce abrasive conditions in rolling mill operations.

Still another object of the invention is to provide an improved method of making rolling mill roll in which rolling operations are reproducible from the initial use of the roll.

SUMMARY OF THE INVENTION

These objects and others which will become apparent hereinafter are attained, in accordance with the invention by following the electroerosion process to which a rolling mill roll blank is subject to a fine machining process. The invention, therefore, is a method which comprises the steps of:

(a) subjecting a roll to an electroerosion process over an outer surface thereof to impart a predetermined contour to the roll; and (b) thereafter subjecting the outer surface to a fine machining process to eliminate peaks in a surface texture formed by the electroerosion process.

The fine machining process can be effected as a mechanical machining process with geometrically undetermined cutters, i.e. the machining process can be carried out with a geometrically undetermined cutter or cutting action, especially a grinding process or a honing process and more specifically by a belt-grinding process.

Advantageously the surface of the roll has a layer of its outer surface removed in the radial direction by an amount of 1.0 μm to 20 μm. The mean roughness value $R_a$ of the surface of the roll should not be significantly altered by the fine machining process.

The machine for carrying out the method may have a fine machining unit integrated with the electroerosion unit in a single apparatus whose machine stand can receive the roll so that the roll is rotatable in that machine stand. Both the electroerosion unit and the fine machining unit can be controlled by a common CNC (computer numerical control) system. The fine machining unit is advantageously a belt-grinding machine, the belt of which can be provided with an abrasive material in the form of corundum or boron nitride particles with a mean particle size between 0.1 μm and 100 μm.

The electric discharge texturing of the surface of the mill roll by electric spark discharge erosion can then be followed in the same machine without transferring the roll by a surface grinding process using the belt grinder or the belt grinders arrayed along the periphery of the roll. The characteristics of roll produced or treated in this manner are reproducible to a high degree and all of the machining parameters both for the EPT spark erosion and for the fine machining can be selected and controlled freely utilizing the CNC controller. The CNC controller can regulate the speed of advance of the grinding belt along the surface of the roll to match the selected grain size of the abrasive belt. The hardness of the pressing roller which presses the grinding belt against the roll surface, the pressing force with which the pressing roll presses against the roll surface and the roll rotational speed are all parameters which can be controlled or selected to yield the finish and shape desired. The textured roll can have its contact area percent level exactly calibrated or set by the treatment process. The roll can be machined with high precision and reproducibility and a uniform roll surface free from shoulders or projections can be made with an increased contact area proportion, higher wear resistance and more efficient utilization. The peaks or tips which are broken off or removed by the grinding operation are eliminated with a minimum reduction in the roughness and thus without detriment to the texture. The entire process can be activated and the fabrication cost of the roll significantly reduced.

Advantageously the surface structure with the greatest roughness depth is maintained so that the mean roughness value $R_a$ remains unchanged and only the undesirable weak tips or peaks are removed. The rolled workpiece is thereby not subjected to a variation in geometry and constant surface properties can be obtained under production conditions. The roll need not undergo any special breaking in even when used immediately after the treatment. Particles from broken off tips which contribute to friction, abrasion and contamination no longer are present even at initial startup.

BRIEF DESCRIPTION OF THE DRAWING

The above and other objects, features, and advantages will become more readily apparent from the following description, reference being made to the accompanying drawing in which.

SPECIFIC DESCRIPTION

Figure 4:
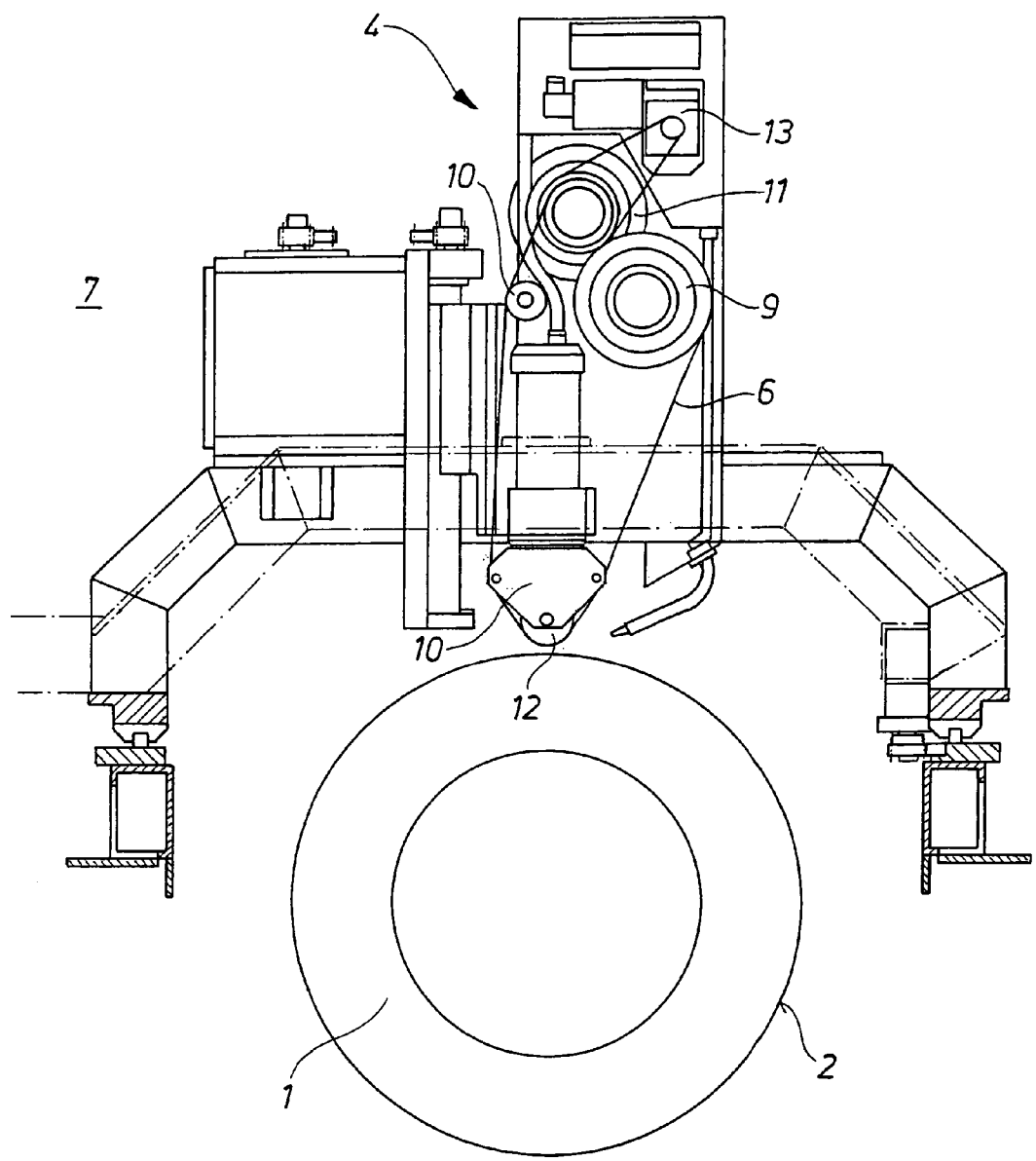
FIG. 4 is a view taken in the direction of the arrow IV of FIG. 3.
Figure 5:
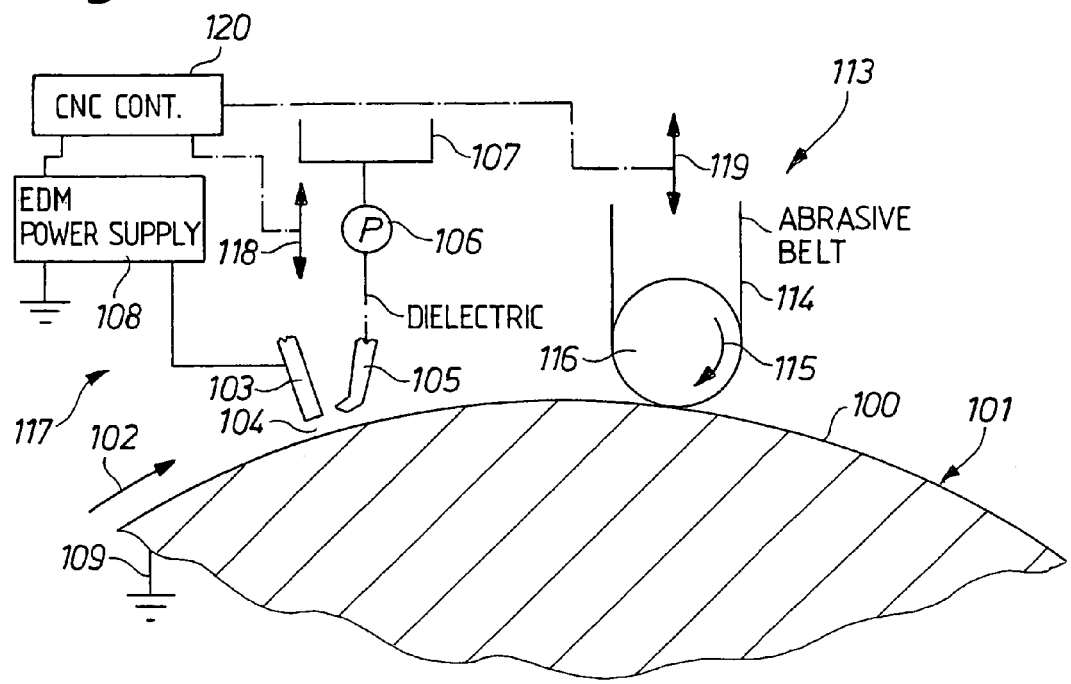
FIG. 5 is a diagrammatic section illustrating principles of the invention.
Figure 6:
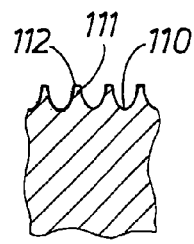
FIG. 6 is a diagrammatic cross section drawn to a much larger scale showing the surface of the roll after electroerosion.

In FIG. 5 we have shown the surface 100 of a rolling-mill roll 101 which is rotated in the direction of the arrow 102 after it has been mounted in the processing machine (FIGS. 1–4) and is there subjected to electric discharge contouring and texturing with a multiplicity of electrodes, only one of which has been shown at 103 in FIG. 5 across a machining gap 104 flooded with a dielectric liquid from a nozzle 105. The dielectric liquid is displaced by a pump 106 from a tank 107, is collected in the usual manner, metal particles are filtered from it, and it is recirculated to the tank 107. An electric-discharge-machining power supply 108 is connected between the electrode 103 and ground and the roll 101 is grounded at 109 so that an electric discharge across the gap 104 will remove material and form a uniform array of cavities 110 separated by peaks 111 (FIG. 6) at least the tips 112 of which are fragile and following the EDT operation might be broken off under the rolling forces should the roll be used in a mill to roll strip or other workpieces.

Figure 7:
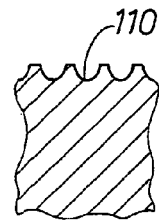
FIG. 7 is the illustration of FIG. 6 showing the removal of the weak peaks.

According to the invention, integrated in this machine is a belt grinding unit 113 which can have an abrasive belt 114 driven in the direction of the arrow 115 and pressed by a pressing roller 116 against the surface of the roll 101. That abrasive belt 114 provided with corundum or silicon nitride particles with a mean particle size of 0.1 μm to 100 μm grinds off the fragile tips 112, leaving the uniform microstructure of cavities 110 (FIG. 7) such that the mean roughness value $R_a$ is practically unaltered.

The EDT unit represented at 117 as a whole and the fine machining unit 113 are each controllable as represented by the arrows 118 and 119 and are controlled in common by the CNC controller 120.

FIGS. 1–4 show the roll treatment machine 7 which can have a machine bed 20 with supports 21 in which a roll 1 can be received and in which the roll 1 is rotatable at at least a trunnion 22. The roll 1 can be positioned upon the supports 21 and removed therefrom by a roll manipulator 23.

Figure 1:
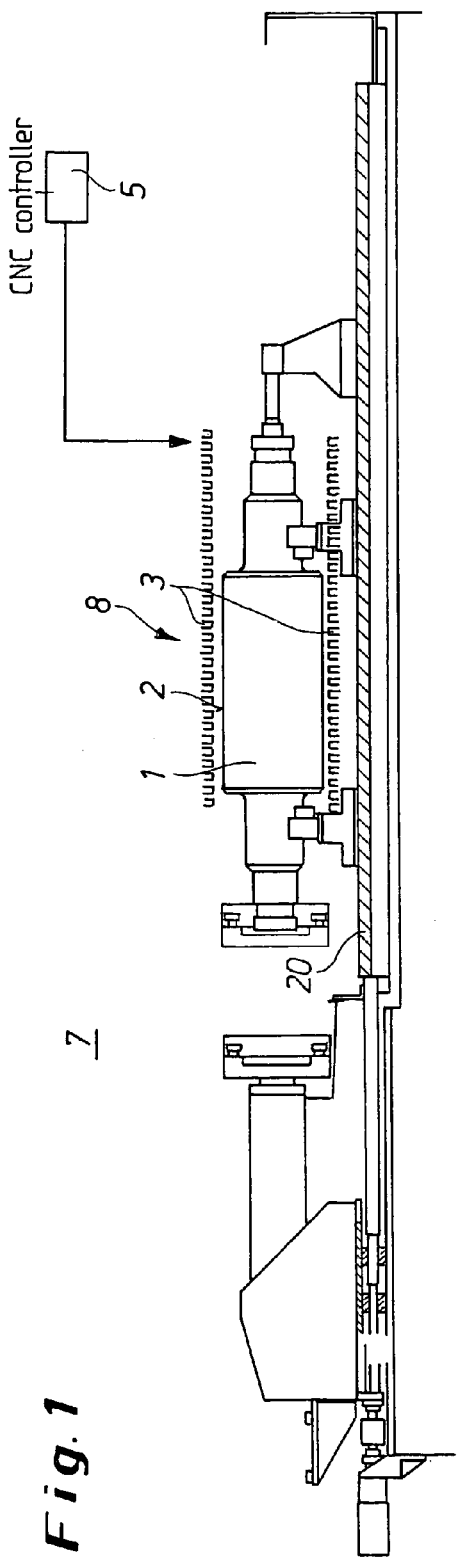
FIG. 1 is a side view of a machine for the treatment of a roll in highly diagrammatic form.
Figure 2:
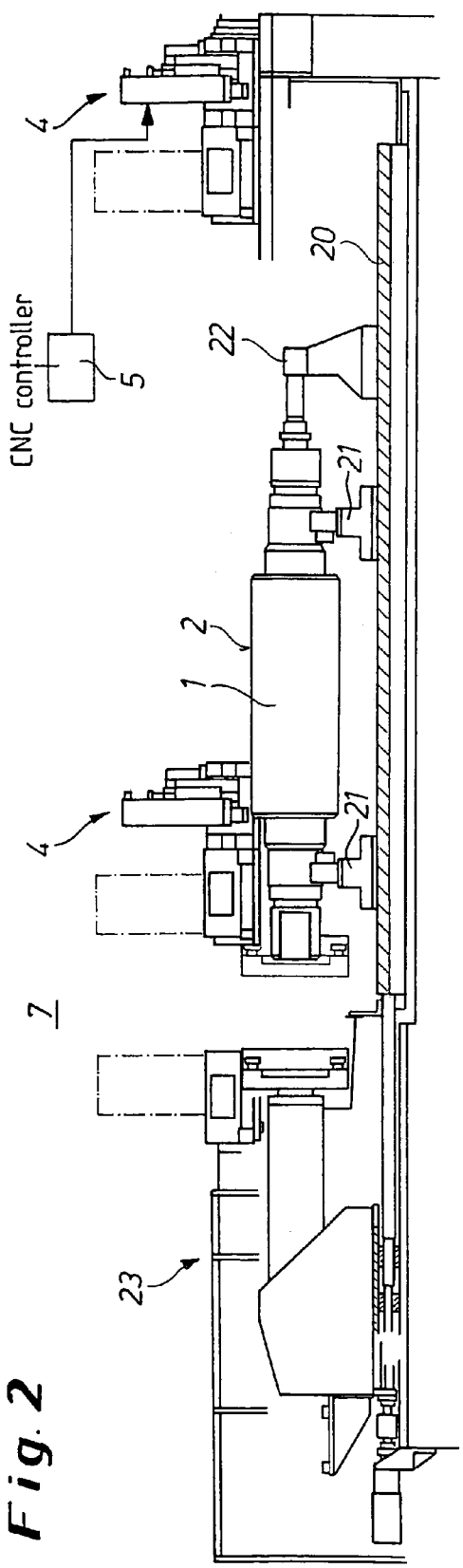
FIG. 2 is the same illustration as in FIG. 1 showing the fine machining unit which is used on this machine.

The machine of FIGS. 1 and 2 is intended to perform EDT on the surface 2 of the roll 1 to provide with high precision the latter with its final contour. The roll 1 has previously been machined approximately to the final contour and has been surface hardened before it is mounted in the machine 7.

As has been indicated only very schematically in FIG. 1, the machine 7 is an electrode-eroding machine with an electroerosion unit 3 formed by a multiplicity of electrodes 8 which can be arrayed over the length of the surface 2 and can be angularly spaced about the axis of rotation of the roll 1 as well. By means of the electrodes 8, an EDT process, i.e. spark discharge erosion or machining, is carried out and the surface 2 given a predetermined uniform mean roughness $R_a$ or roughness depth as previously described. The electrodes 8 are held at exactly controlled spacings from the surface 2 and pulsed electric current is supplied to form the cavities 110 in the manner described. The result is a diffuse structure with a high degree of uniformity within narrow tolerances. The textured spark discharge treated surface 2 is then subjected to a belt grinding with at least one belt-grinding unit 4 which can be displaced along the length of the roll 1 from its right-hand position to its left-hand position as shown in FIG. 2. Here only the belt-grinding unit 4 has been shown although both units 3 and 4 are provided in the machine. The right-hand position of the unit 4 is the rest or inoperative position. The left-hand position is an extreme position in the grinding operation in which the belt grinder 4 has been displaced along the surface 2 from right to left.

The grinding process utilizing the belt grinder 4 is so carried out, i.e. its parameters are so controlled, that the surface 2 is calibrated to suit the predetermined target data, i.e. the surface 2 is configured to have the desired contact percentage or ratio with the workpiece during the rolling operation.

Furthermore, both the electroerosion unit 3 and the belt grinder 4 are controlled in common by the CNC controller 5 (FIG. 2) and 120 (FIG. 5).

Figure 3:
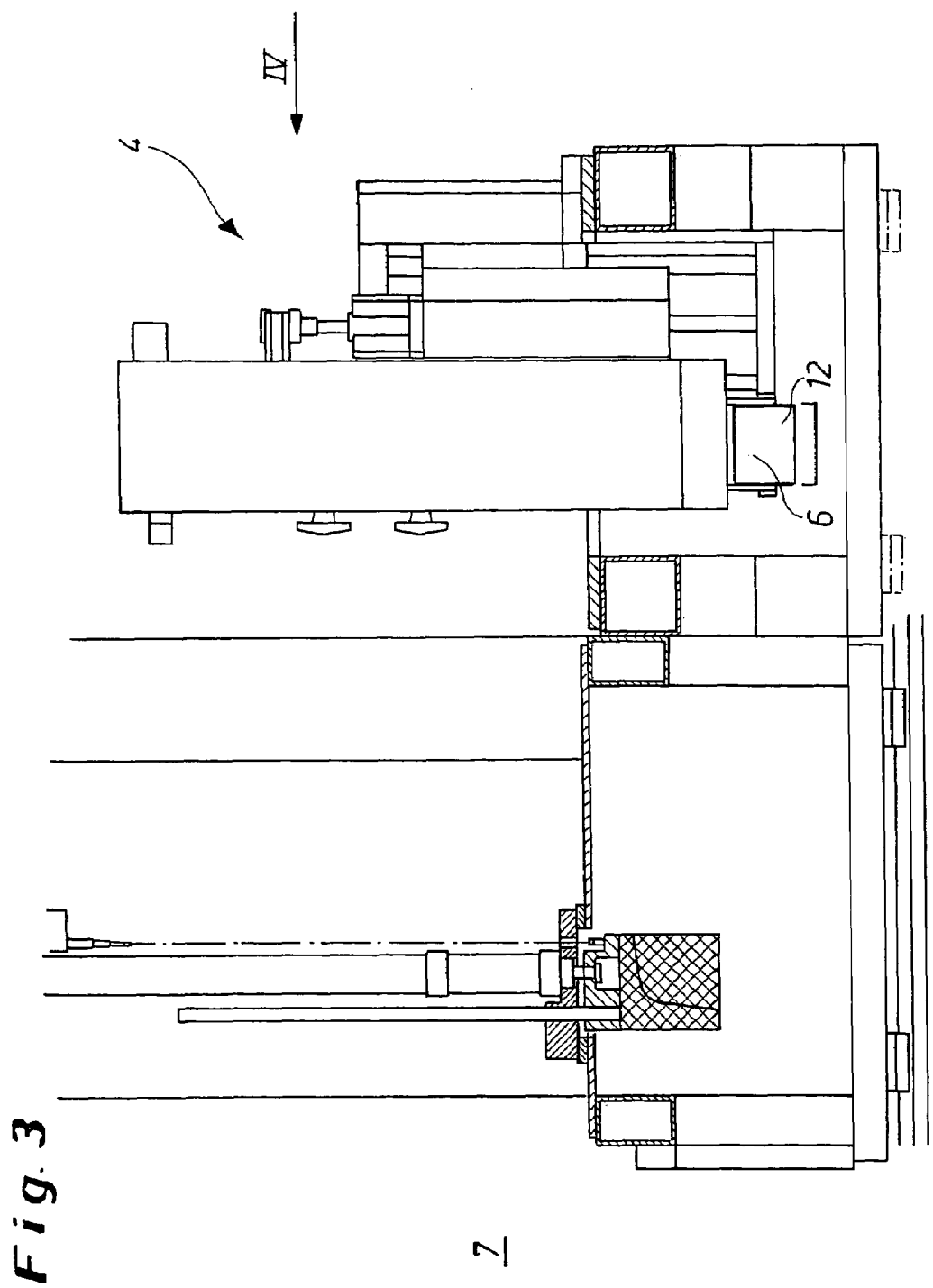
FIG. 3 is a detail of FIG. 2 drawn to a larger scale.

Details of the construction of the belt grinder 4 and the belt grinding head which moves along the roll 1 can be seen in FIGS. 3 and 4.

The belt grinder 4 has a grinding belt 6 whose surface is provided with abrasive particles of corundum or boron nitride. The grain size of the abrasive particles is so selected that the roll 1 will have the desired surface contour or texture following the treatment. The particles can have a mean particle size of less than 1 µm for fine grinding and a higher mean particle size of say 50 to 100 µm when greater removal rates are required for coarse machining.

The belt 6 passes around a roller 12 which is pressed by the belt guide 10 against the surface of the roll 1. The abrasive belt 6 can be supplied from a roll of abrasive strip as shown at 9 and wound up again in the takeup roll 11. Belts 6 of lengths of 15 to 50 m are generally used.

The pressing roller 12 applies the belt 6 in the radial direction and the belt 6 can be driven by the controllable drive motor 13, also under CNC control.

By the choice of the abrasive on the belt 6, the radial pressure of the belt 6 against the roll 1, the speed of the belt 6 controlled by the motor 13, the roll speed and the axial displacement of the grinding head along the roll 1, the various parameters of the grinding operation can be selected and controlled to provide the desired result.

The displacement of the unit 4 along the roll 1 is preferably controlled in a stepless manner. The rolls 9 and 11 allow continuous supply of grinding surfaces to the working surface 2 of the roll 1 and thereby provide a surface finish which is free from discontinuities. The mean roughness value scarcely changes at all during the superfinishing of the surface 2 by the grinding action.

The fine machining unit 4 is integrated in the electroerosion machine 7 although it can be provided outside this machine, for example, in combination with a measurement or inspection station (not shown). When the unit 4 is integrated in the machine, it can be mounted in a saddle engaging over the tank cover so that the grinder can engage the surface 2 of the roller from above. When the unit 4 is provided on an inspection stand, the unit 4 can be so oriented that the grinding belt is pressed horizontally against the roll 1.

We claim:

1. A method of treating a roll comprising the steps of: while supporting the roll in a surface-treatment machine,
   (a) subjecting the roll to an electroerosion process over an outer surface thereof by treating the outer surface of the roll with an electroerosion apparatus to impart a predetermined contour to said roll and form on the outer surface an outer texture having outwardly projecting peaks having outer tips; and
   (b) thereafter subjecting said outer surface to a fine machining process by treating the outer surface with a belt-grinding apparatus to eliminate only the outer tips of the peaks in the surface texture formed by the electroerosion process without changing the texture of the roll.

2. The method defined in claim 1 wherein the fine machining process is carried out with a geometrically indeterminate cutting action.

3. The method defined in claim 2 wherein the fine machining process is carried out by a grinding or honing process.

4. The method defined in claim 1 wherein a layer having a thickness of between 1.0 µm and 20 µm is removed from said outer surface by said fine machining process.

5. The method defined in claim 4 wherein a mean roughness value $R_a$ of said surface texture remains unchanged following said fine machining process.

6. The method defined in claim 5 wherein the fine machining process is carried out by applying a moving belt having corundum or silicon nitride particles with a mean particle size between 0.1 µm and 100 µm against said outer surface.

7. The method defined in claim 1 wherein a mean roughness value $R_a$ of said surface texture remains unchanged following said fine machining process.

8. The method defined in claim 1 wherein the fine machining process is carried out by applying a moving belt having corundum or silicon nitride particles with a mean particle size between 0.1 µm and 100 µm against said outer surface.

9. The method defined in claim 1 wherein said roll is a rolling mill roll.

10. A machine for treating a roll comprising:
    a machine stand adapted to support the roll;
    an electroerosion unit for subjecting the roll while supported on the stand to an electroerosion process over an outer surface thereof to create on the outer surface of the roll a texture having outwardly projecting peaks with outer tips; and
    a belt grinding device integrated with said electroerosion unit for subjecting said outer surface while the roll is supported on the stand to a fine machining process to eliminate only the tips of the peaks in the surface texture formed by the electroerosion process without changing the texture imparted to the roll.

11. The machine defined in claim 10, further comprising a CNC controller for both of said units.

12. The machine defined in claim 10 wherein said belt grinding device has a grinding belt provided with corundum or silicon nitride particles with a mean particle size between 0.1 µm and 100 µm.

13. The method defined in claim 1 wherein the roll is rotated in the machine about an axis during steps (a) and (b).

14. The machine defined in claim 10, further comprising means for supporting the roll and rotating it in the stand about a roll axis for relatively moving the roll outer surface, the electroerosion unit, and the grinding device.

* * * * *